United States Patent
Yokota et al.

(10) Patent No.: US 7,254,705 B2
(45) Date of Patent: Aug. 7, 2007

(54) SERVICE PROVIDING SYSTEM IN WHICH SERVICES ARE PROVIDED FROM SERVICE PROVIDER APPARATUS TO SERVICE USER APPARATUS VIA NETWORK

(75) Inventors: Kaoru Yokota, Ashiya (JP); Motoji Ohmori, Hirakata (JP); Makoto Tatebayashi, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 847 days.

(21) Appl. No.: 10/375,138

(22) Filed: Feb. 28, 2003

(65) Prior Publication Data
US 2003/0177363 A1 Sep. 18, 2003

(30) Foreign Application Priority Data
Mar. 15, 2002 (JP) ............................. 2002-071862

(51) Int. Cl.
*H04L 9/32* (2006.01)
(52) U.S. Cl. ..................................................... 713/155
(58) Field of Classification Search .............. 713/183, 713/155
See application file for complete search history.

(56) References Cited
U.S. PATENT DOCUMENTS

| | | | |
|---|---|---|---|
| 6,877,097 B2 * | 4/2005 | Hamid et al. ................ | 713/186 |
| 6,934,838 B1 * | 8/2005 | Boyce et al. ................ | 713/156 |
| 7,103,778 B2 * | 9/2006 | Kon et al. ................... | 713/185 |
| 2001/0034833 A1 | 10/2001 | Yagasaki et al. | |
| 2001/0045451 A1 | 11/2001 | Tan et al. | |
| 2002/0069361 A1 * | 6/2002 | Watanabe et al. ........... | 713/185 |
| 2003/0084288 A1 * | 5/2003 | de Jong et al. ............. | 713/168 |

FOREIGN PATENT DOCUMENTS

WO 01/39428 5/2001

OTHER PUBLICATIONS

Kerberos: An Authentication Service for Open Network Systems, J. Steiner, C. Neuman, J. Schiller, Internet Publication, Mar. 30, 1988.

* cited by examiner

*Primary Examiner*—Matthew Smithers
(74) *Attorney, Agent, or Firm*—Wenderoth, Lind & Ponack, L.L.P.

(57) ABSTRACT

A service user's personal information that has been verified and to which a digital signature has been attached by a personal information verification apparatus (signed-personal information) is stored in a highly secure form within a service user apparatus. For receiving services, the service user apparatus transmits the signed-personal information stored there into a service provider apparatus. The service provider apparatus verifies the signed-personal information based on the digital signature, and then provides services based on the personal information.

16 Claims, 13 Drawing Sheets

FIG.12A

- "NAME DATA"
- "TELEPHONE NUMBER DATA"
- "ADDRESS DATA"
- "BIRTH DATE DATA"
- "CREDIT CARD NUMBER DATA"
- "HEIGHT AND WEIGHT DATA"
- "BLOOD TYPE DATA"
- "PUBLIC AUTHENTICATION KEY DATA"

| "ID NUMBER" | "NAME DATA" | "SIGNATURE DATA" |
| "ID NUMBER" | "TELEPHONE NUMBER DATA" | "SIGNATURE DATA" |
| "ID NUMBER" | "ADDRESS DATA" | "SIGNATURE DATA" |
| "ID NUMBER" | "BIRTH DATE DATA" | "SIGNATURE DATA" |
| "ID NUMBER" | "CREDIT CARD NUMBER DATA" | "SIGNATURE DATA" |
| "ID NUMBER" | "HEIGHT AND WEIGHT DATA" | "SIGNATURE DATA" |
| "ID NUMBER" | "BLOOD TYPE DATA" | "SIGNATURE DATA" |
| "ID NUMBER" | "PUBLIC AUTHENTICATION KEY DATA" | "SIGNATURE DATA" |

1201

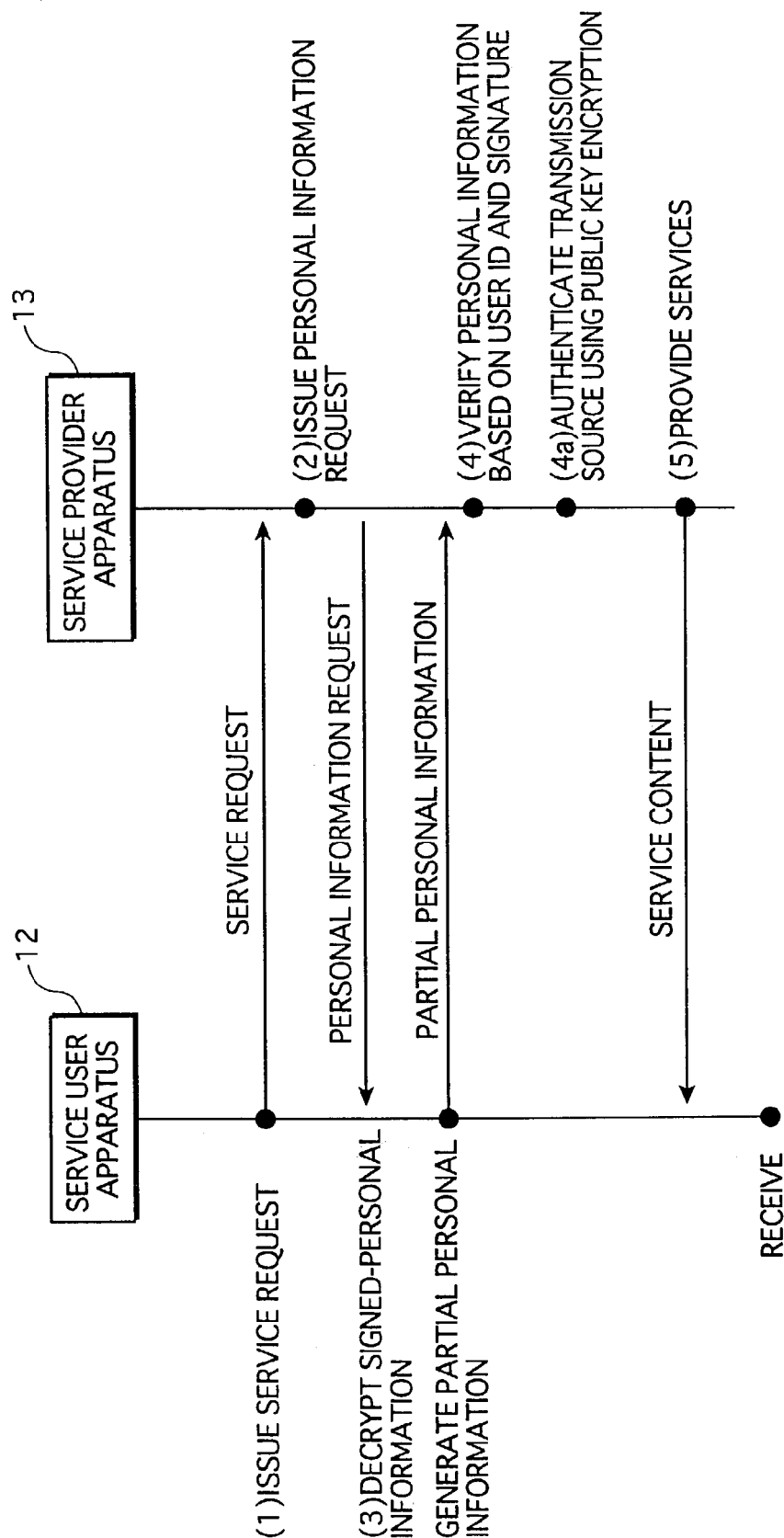

SERVICE PROVIDING SYSTEM IN WHICH SERVICES ARE PROVIDED FROM SERVICE PROVIDER APPARATUS TO SERVICE USER APPARATUS VIA NETWORK

BACKGROUND OF THE INVENTION (1) Field of the Invention

The present invention relates to a service providing system in which various services (e.g., sale of commodities and pay distribution of digital content including music and video) are provided from a provider to a user via a network such as the Internet. In particular, the present invention relates to a service providing system where the security of a user' personal information is protected with high reliability in providing services to the user. The present invention also relates to a service providing method realizing the same.

(2) Description of Related Art

With the recent widespread use of the Internet in ordinary households, there has been a significant growth in the business of providing various pay services (e.g., sale of commodities and distribution of digital content such as music and video) via a network. For receiving such services, service users are required to send their personal information that is necessary for the delivery, payment, etc. of the commodity to service providers. Typical examples of such personal information include a name, address, telephone number, and credit card number. Service providers verify personal information sent from users for user authentication purposes, and provide services only to users whose personal information is proven to be authentic.

However, it is inconvenient for such a user who repeatedly uses services of the same service provider to send his or her personal information every time that the user intends to receive services from the service provider. It is also burdensome for the service provider side to verify personal information sent from a large number of users every time that the service provider provides services to them.

In view of this, service providing systems that can improve the convenience of service users and alleviate burdens on service providers are desired.

The following is one example of the basic forms of such systems. In the system, a service user is required to send his or her personal information to a service provider only when using the service provider for the first time. The personal information is verified and registered by the service provider. To be more specific, the service provider enters, in its database, the verified personal information together with a user ID and password set by the service user. Once the personal information is registered, the service user is simply required to send the registered user ID and password to the service provider when intending to receive services. The service provider authenticates the service user with the use of the password, and obtains the service user's personal information based on the user ID, out of plural sets of personal information that have been registered. In this system, each service user is not required to send his or her personal information every time that the user intends to receive services. Also, the service provider is required to verify each user's personal information once.

In the above system, however, a service user who uses a plurality of service providers needs to register a different user ID and a different password with each service provider, and to memorize the registered user IDs and passwords. In this case, the service user is likely to suffer from complicated management of the user IDs and passwords. Further, even with the need to verify each user's personal information only once, the service provider side may still suffer from a heavy processing load if the number of service users is large.

In view of such disadvantages, service providing systems that include a management center dedicated to verification of personal information and management of verified personal information have been developed. A typical example of such is a system employing .NET Passport (described in "*Microsoft .NET Passport Technical Overview* (September 2001)").

In the system employing .NET Passport, a service user registers in advance his or her personal information with a management center, together with a user ID and password. For registration of personal information, the management center performs the same verification process as performed by the service provider in the above system. To receive services from the service provider, the service user, who has once registered his or her personal information, sends the user ID and password to the management center, so as to obtain the registered personal information. Then, the service user sends the obtained personal information to the service provider. It should be noted here that the management center holds a private cryptograph key which is unique to each service provider, and each service provider shares the corresponding unique private cryptograph key. The management center encrypts the personal information by using the key shared by the service provider, and transmits the encrypted personal information to the service user. The service user receives the encrypted personal information from the management center, and transmits the encrypted personal information to the service provider. The service provider receives the encrypted personal information from the service user, and decrypts the encrypted personal information by using the shared key.

In this system, the service user is simply required to register one user ID and one password with the management center. Also, the service provider is freed from the heavy processing load of verifying personal information.

However, the service providing system including the management center has the following problem.

The management center manages personal information for all service users who have used any service provider within the system. This means that personal information for a large number of service users is concentrated at the management center. The management center storing personal information for a large number of service users can often be targeted by hackers who attempt an unauthorized access to the personal information. If the database of personal information is subjected to such an unauthorized access, a massive amount of personal information could leak out. This possibility may cause service users to feel uncertain about the security of the system, and to hesitate to receive services via a network. Such lack of user confidence in the system security may hinder the widespread use and advancement of the business of providing services via a network.

Further, in the above system, the service users are required to access the management center every time that they intend to receive services. This increases the processing load on the management center. If a large number of service users access the management center at the same time, the management center may fail or crash due to the heavy processing load exceeding its capacity.

SUMMARY OF THE INVENTION

In view of the above problems, the object of the present invention is to provide a service providing system that includes a management center and that has an enhanced security in managing personal information and an enhanced stability and reliability during the system operation.

To achieve the above object, the present invention provides a service providing system that includes a verification apparatus, a service user apparatus, and a service provider apparatus. The verification apparatus is operable to receive a user's personal information, and includes a personal information verification unit operable to verify the authenticity of the users personal information. The verification method apparatus also includes a signed-personal information generation unit operable, when the verification by the personal information verification unit is successful, to generate signed-personal information by attaching a digital signature to the user's personal information, and to transmit the signed-personal information. The service user apparatus includes a signed-personal information reception unit operable to transmit the user's personal information to the verification apparatus and to receive the signed-personal information from the verification apparatus, an information management unit operable to store and manage the received signed-personal information, a service request transmission unit operable to read the signed-personal information from the information management unit and to transmit the read signed-personal information together with a service request, and a service reception unit operable to receive services. The service provider apparatus is operable to provide, based on the user's personal information, the services to the service user apparatus via the network. The service provider apparatus includes a service request reception unit operable to receive the service request and the signed-personal information from the service user apparatus, a signed-personal information verification unit operable to verify an authenticity of the received signed-personal information, based on the digital signature included therein, and a service provision unit operable to provide the services to the service user apparatus in response to the service request, when the verification by the signed-personal information verification unit is successful.

According to this construction, verified personal information (signed-personal information) for each user is not centrally stored by the personal information verification apparatus placed at the management center, but is stored in the service user apparatus held by each user. Due to this, such a case can be avoided where a single unauthorized access to the personal information verification apparatus causes a massive amount of personal information to leak out from the apparatus. Therefore, the system security can be enhanced. Also, the service user apparatus is not required to access the personal information verification apparatus when receiving services. Consequently, even if a large number of users request services at the same time in the service providing system, an excessively heavy load is not placed on the personal information verification apparatus. Therefore, the stability and reliability of the service providing system during operation can be enhanced.

Further, in conventional service providing systems, a service user apparatus is required to access an authentication center every time when receiving services. In such systems, the authentication center can be given information about the state of service use, such as information about the frequency and types of service providers each user uses (i.e., preference of each service user, sales performance of each service provider, etc.). In the service providing system relating to the present embodiment, however, the service user apparatus is not required to access the authentication center when receiving services. Therefore, service users and service providers in the system do not have to worry about leakage of such information via the authentication center.

Here, the information management unit may be operable to store the signed-personal information in a state that prevents external access thereof, and to allow the signed-personal information to be read only when key information set in advance is inputted.

According to this construction, signed-personal information for each user is stored, in a highly secure form, in the service user apparatus held by each service user. It is therefore difficult for a third party, with the intention of abusing the personal information, to read the signed-personal information in an unauthorized manner. Therefore, the reliability of the signed-personal information is not degraded as compared with the case of conventional systems. Specifically, the key information may be password information or biometrics information.

Further, the information management unit may comprise a key generation subunit operable to generate an encryption key to be used for encrypting the signed-personal information, and a decryption key to be used for decrypting the encrypted signed-personal information, a key storage subunit operable to store the decryption key, an encryption subunit operable to encrypt the signed-personal information by using the encryption key, an information storage subunit operable to store the signed-personal information encrypted by the encryption subunit, and a decryption subunit operable to decrypt the encrypted signed-personal information read from the information storage subunit by using the decryption key read from the key storage subunit.

According to this construction, the reliability of the signed-personal information stored in the service user apparatus can be enhanced further. This is because the signed-personal information is encrypted, and its key for decryption is stored in a protected area. In addition, only keys, whose data amount is small, are stored in the protected area. A storage medium to be used here can therefore be realized by a low-cost medium in which the protected area occupies only a small area within the entire storage area. Specifically, the information management unit may comprise an IC memory card that includes a protected storage area, a general storage area, and an arithmetic unit. The protected storage area may be protected from external access thereof, the general storage area may allow external access thereof, the arithmetic unit may be operable to execute a program, the encryption subunit and the decryption subunit may be realized by the arithmetic unit executing programs stored in the protected storage area, the key storage subunit may be operable to store the decryption key into the protected storage area, and the information storage subunit may be operable to store the encrypted signed-personal information into the general storage area.

Also, to further ensure the reliability of the signed-personal information, the service request reception unit may be operable to transmit a personal information request to the service user apparatus, before receiving the signed-personal information from the service user apparatus, and the service request transmission unit may be operable to receive the personal information request before starting to transmit the signed-personal information, and only when the received personal information request satisfies a predetermined condition, to transmit the signed-personal information to the service provider apparatus.

According to this construction, even if a third party attempts to impersonate the service provider and obtain, in an unauthorized manner, signed-personal information that is being transmitted to the service provider, such an attempt ends in failure. Therefore, the reliability of the signed-personal information within the system is enhanced. Specifically, the personal information request may have been generated in a format that is determined in advance, and the personal information request may have been verified and a digital signature may have been attached thereto by the verification apparatus. Further, the service request transmission unit may be operable to verify an authenticity of the digital signature attached to the personal information request by using a form-signing public key distributed in advance from the verification apparatus, and when the verification of the digital signature using the form-signing public key is successful, to determine that the personal information request satisfies the predetermined condition. That is to say, the personal information verification apparatus also verifies authenticity of the contents of the personal information request in advance, in the same manner as that for verifying an authenticity of personal information in advance.

Also, a digital signature may be attached in the following way. That is, the user's personal information may comprise a plurality of data items, the signed-personal information generation unit may be operable to generate the signed-personal information, by attaching a digital signature to each data item of the user's personal information, and the signed-personal information verification unit may be operable to verify an authenticity of the signed-personal information, by verifying an authenticity of the digital signature attached to each data item. Due to this, the signature verification can be strictly performed in units of items of personal information.

Also, the user's personal information may comprise a plurality of data items, and the signed-personal information generation unit may be operable to generate the signed-personal information, by attaching a user ID which is unique to the user to each data item and attaching a digital signature to each data item to which the user ID has been attached. Further, the signed-personal information verification unit may be operable to judge whether or not user IDs attached to all data items of the signed-personal information received by the service request reception unit match, and when judging that the user IDs do mot match, to determine that verification of the signed-personal information is unsuccessful.

According to this construction, even if a service user attempts to tamper his or her signed-personal information with the intention of receiving services in an unauthorized manner, such an attempt ends in failure. For example, two service users may attempt to combine items of their signed-personal information so as to forge signed-personal information for a person who does not actually exist. In such a case, although each item of the forged personal information is given a signature that is authentic, user IDs attached to all the items of the forged personal information do not match. The service provider can therefore detect such forged personal information. Specifically, the signed-personal information generation unit may be operable to attach, to each data item to which the user ID has been attached, a digital signature generated by using contents of the data item and the user ID, and the signed-personal information verification unit may be operable to verify an authenticity of the signed-personal information, by verifying an authenticity of the digital signature attached to each data item.

Also, the service user apparatus may further include an authentication key generation unit operable to generate a pair of public and private keys to be used for authentication of the service user apparatus, and a private key storage unit operable to store, in a form that limits external access thereof, the private key generated by the authentication key generation unit. The signed-personal information reception unit may be operable to incorporate the private key generated by the authentication key generation unit into the user's personal information that is to be transmitted to the verification apparatus, and the service request transmission unit may be operable to incorporate the private key generated by the authentication key generation unit into the signed-personal information that is to be transmitted to the service provider apparatus. Further, the signed-personal information verification unit may be operable to perform authentication of the service user apparatus by using a public key encryption method, by referring to the private key incorporated in the signed-personal information transmitted by the service request transmission unit, and when the authentication is successful, to determine that verification of the signed-personal information is successful.

According to this construction, when signed-personal information is transmitted from the service user apparatus to the service provider apparatus, the service provider apparatus authenticates a transmission source of the signed-personal information. Therefore, even if the signed-personal information being transmitted from the service user apparatus to the service provider apparatus is wiretapped by a third party, the third party cannot receive services in an unauthorized manner by using the wiretapped personal information. Therefore, the reliability of the signed-personal information can be enhanced further. Moreover, the private key storage unit may comprise a storage medium having a protected storage area that allows only limited external access thereof, and store the private key into the protected storage area.

BRIEF DESCRIPTION OF THE DRAWINGS

These and other objects, advantages and features of the invention will become apparent from the following description thereof when taken in conjunction with the accompanying drawings that illustrate a specific embodiment of the invention.

In the drawings:

FIGS. 12A shows personal information that is yet to be verified in the modified example;

FIG. 12B shows personal information that has been verified in the modified example; and FIG. 13 shows a processing flow of a service provision procedure in the modified example.

DETAILED DESCRIPTION OF THE PREFERRED EMBODIMENT

The following describes a preferred embodiment of the present invention in detail, with reference to the drawings.

First Embodiment

I. Overall Construction

Figure 1:
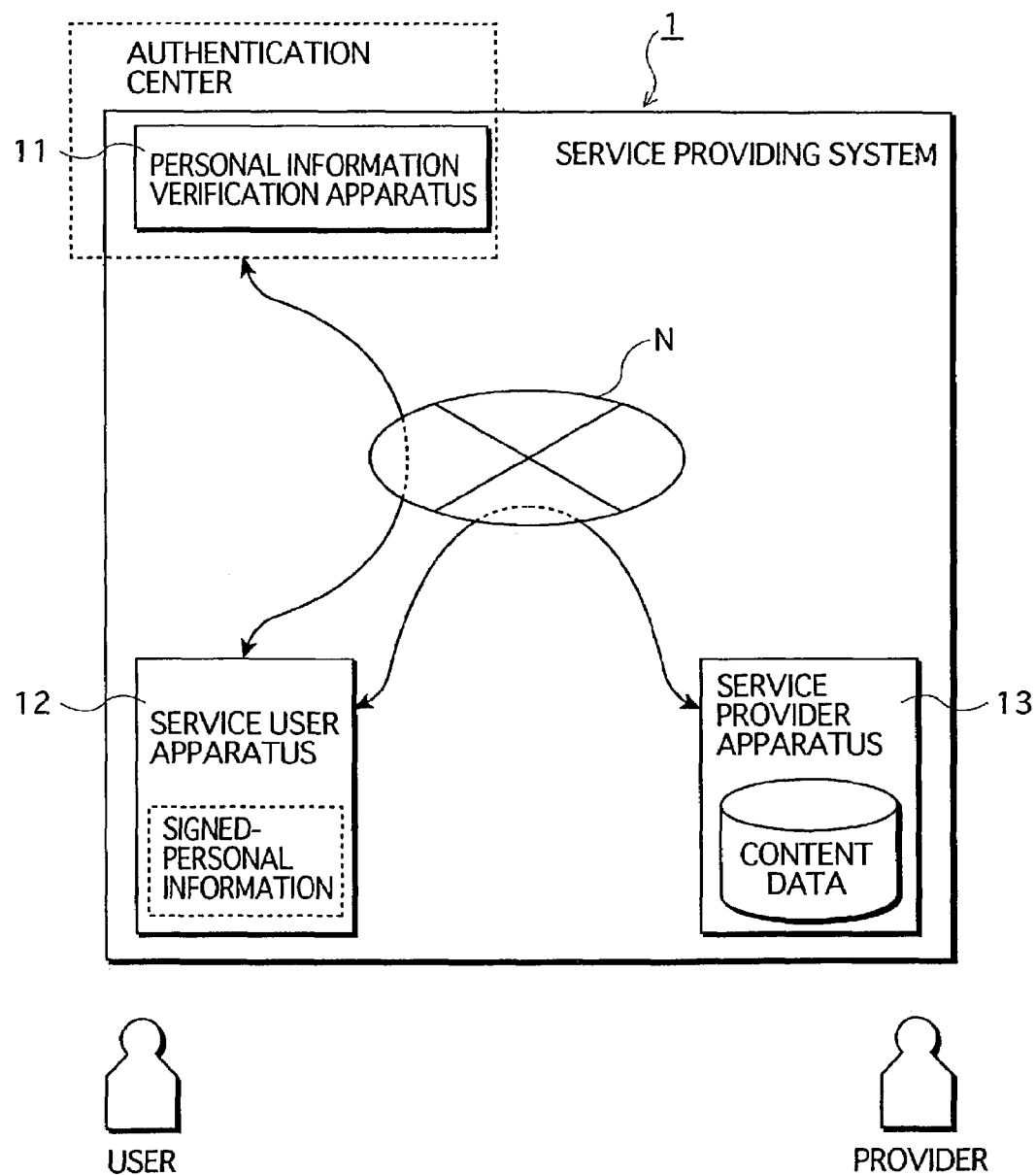
FIG. 1 is a block diagram showing the overall construction of a service providing system to which a preferred embodiment of the present invention relates.

FIG. 1 is a diagram showing the overall construction of a service providing system to which a first embodiment of the present invention relates. The service providing system 1 relating to the present embodiment is a system in which pay services are provided from a service provider to a service user. In the system 1, the service user presents, to the service provider, personal information that is verified and signed in advance by an authentication center, when the service user intends to receive services.

The service providing system 1 has the following apparatus construction. A personal information verification apparatus 11, a service user apparatus 12, and a service provider apparatus 13 are connected with one another via a network "N". The personal information verification apparatus 11 is placed at the authentication center that performs verification operations of service users' personal information for user authentication purposes. The service user apparatus 12 is used by a service user who intends to receive services. The service provider apparatus 13 is used by a service provider who provides services. Although the system 1 is assumed to include a plurality of service user apparatuses and a plurality of service provider apparatuses, only one service user apparatus and one service provider apparatus are shown in FIG. 1 for ease of explanation.

The personal information verification apparatus 11 is specifically realized by a computer or a server that executes a program for user authentication. Also, the service user apparatus 12 is realized by a personal computer connected to the network "N" or a portable terminal having communication functions. The personal computer or the portable terminal executes a program supplied in advance by the authentication center to the user and installed therein, so as to function as the service user apparatus 12. As one example, the program installed in the service user apparatus 12 may have been downloaded from a web page managed by the authentication center. The service provider apparatus 13 is realized by a computer or a server that executes a program for service provision.

The personal information verification apparatus 11 verifies a user's personal information that is transmitted from the service user apparatus 12. The personal information verification apparatus 11 attaches a digital signature to the verified personal information, and returns the personal information having the digital signature to the service user apparatus 12. The digital signature guarantees, to the service provider, that the personal information having the digital signature (hereafter referred to as the "signed-personal information") is reliable without containing any errors or is not false. The personal information verification apparatus 11 does not hold personal information.

The service user apparatus 12 transmits the user's personal information inputted by the service user, to the personal information verification apparatus 11, which verifies the personal information. The service user apparatus 12 stores the verified signed-personal information into its internal memory card that allows only limited references from external sources. Thereafter, upon receipt of a user instruction to obtain services, the service user apparatus 12 transmits the signed-personal information, together with a service request, to the service provider apparatus 13. The service user apparatus 12 then receives the requested service content from the service provider apparatus 13. It should be noted here that this signed-personal information is valid only for a service provider apparatus 13 managed by a service provider that has made a contract with the authentication center to participate in the service providing system 1.

The service provider apparatus 13 provides services based on signed-personal information. The signed-personal information is transmitted by the user who intends to receive services by using the service user apparatus 12. Before providing services, the service provider apparatus 13 verifies only the digital signature included in the signed-personal information, without verifying the personal information itself. To verify the digital signature, the service provider apparatus 13 uses signature verification data (e.g., a public key) obtained in advance from the personal information verification apparatus 11. For example, such signature verification data may be transmitted from the personal information verification apparatus 11 to the service provider apparatus 13 at the time when the service provider managing the service provider apparatus 13 signs the contract with the authentication center.

In the service providing system 1 relating to the present embodiment as described above, verified signed-personal information for each user is not stored in the personal information verification apparatus 11 placed at the authentication center, but is stored in the service user apparatus 12 that is held by each user. Also, the service user apparatus 12 is not required to access the personal information verification apparatus 11 when receiving services. This system 1 is therefore free from such problems that are likely to cause the security and the operation stability of the system to be degraded. The problems include the concentration of a massive amount of personal information at the authentication center, and the jamming of accesses to the authentication center.

Further, with the enhanced security in managing signed-personal information at the service user apparatus 12, the risk of leakage, tampering, etc., of the signed-personal information can be prevented from increasing as compared with the case of conventional systems.

To be more specific, the service providing system 1 relating to the present embodiment solves the problems with conventional systems by enabling signed-personal information for each user to be stored in the service user apparatus held by each user. At the same time, the service providing system 1 prevents deterioration in the reliability of signed-personal information, by enabling the signed-personal information to be managed strictly by the service user apparatus.

II. Processing Flow

The following describes a flow of the processing to be executed in the service providing system 1 relating to the present embodiment.

As can be known from the explanation given on the overall construction of the service providing system 1, the processing to be executed in the service providing system 1 can be roughly divided into two procedures. One procedure relates to the verification of a service user's personal information (hereafter referred to as a "personal information verification procedure"), and is executed by the personal information verification apparatus 11 and the service user apparatus 12. The other procedure relates to the provision of services from the service provider to the service user (hereafter referred to as a "service provision procedure"), and is executed by the service user apparatus 12 and the service provider apparatus 13. The following describes a processing flow of each procedure, with reference to the drawings.

A. Personal Information Verification Procedure

The following first describes a processing flow of the personal information verification procedure, with reference to the drawings.

Figure 2:
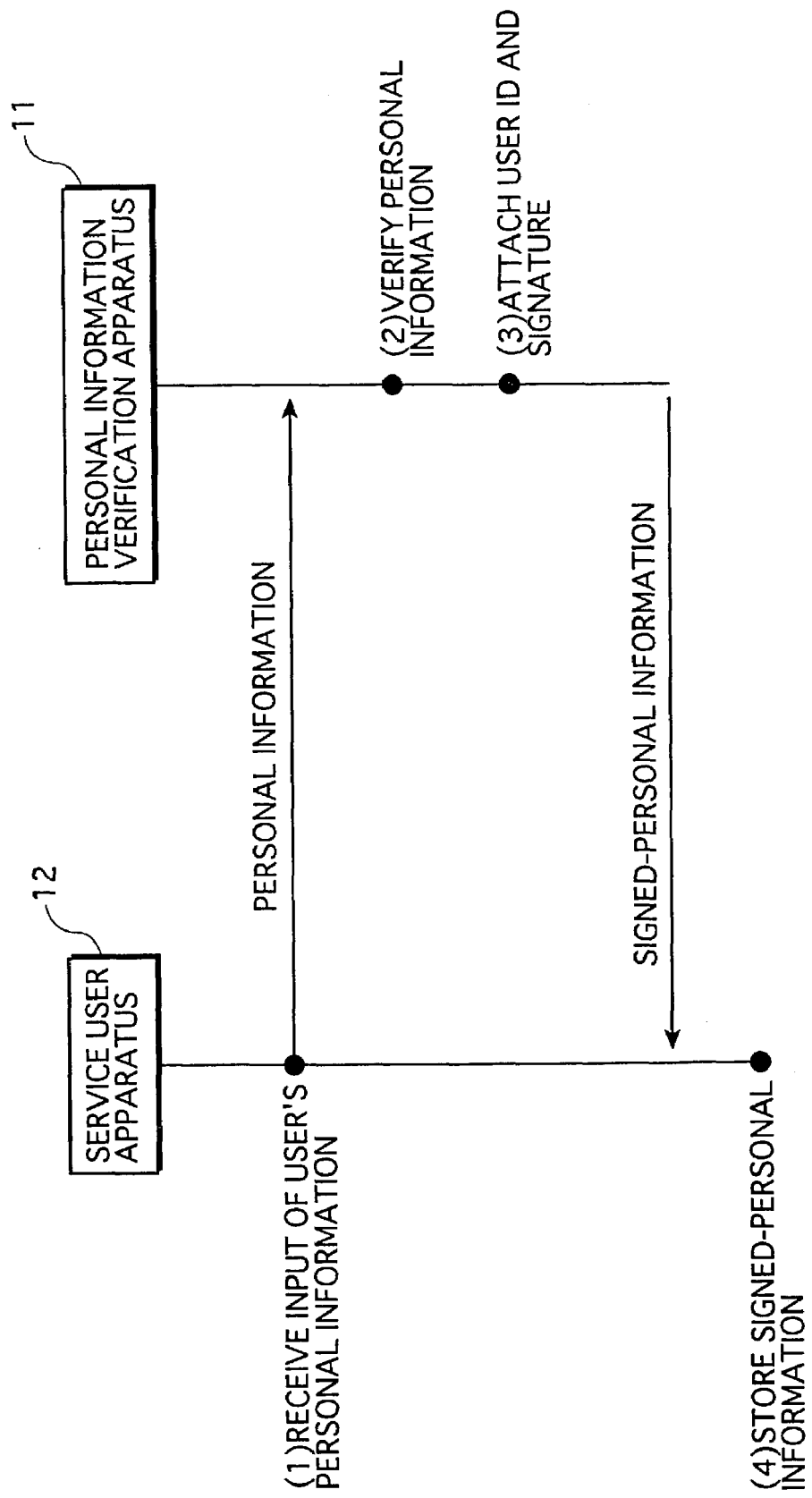
FIG. 2 shows a processing flow of a personal information verification procedure in the embodiment.

FIG. 2 shows the processing flow of the personal information verification procedure that is executed by the personal information verification apparatus 11 and the service user apparatus 12.

(1) Receive Input of User's Personal Information

First, the service user apparatus 12 receives input of personal information from the service user. The service user apparatus 12 transmits the input user's personal information to the personal information verification apparatus 11 placed at the authentication center.

Figure 3:
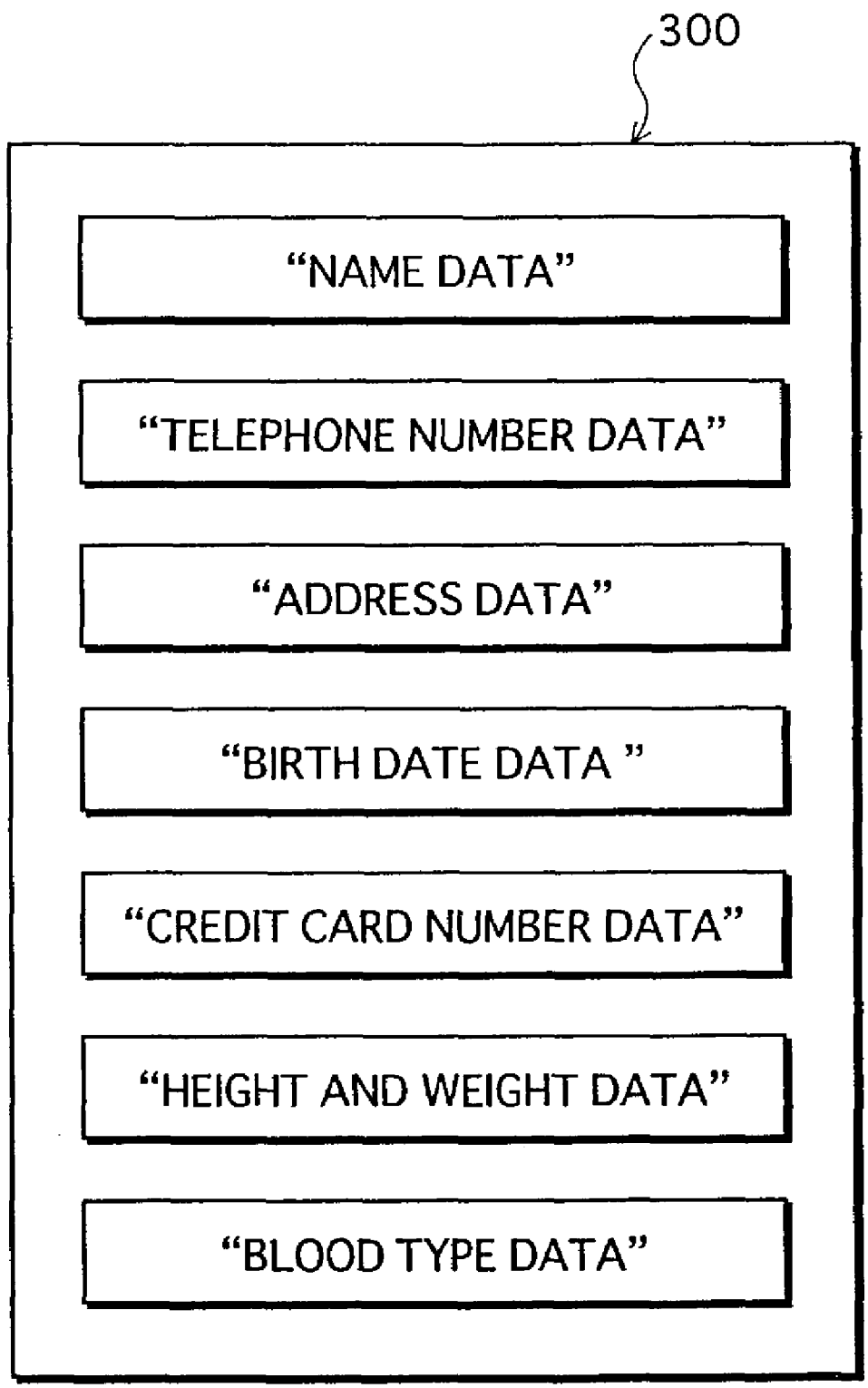
FIG. 3 shows an example structure of personal information that is yet to be verified in the embodiment.

FIG. 3 schematically shows the structure of the user's personal information to be transmitted from the service user apparatus 12 to the personal information verification apparatus 11. The user's personal information shown in FIG. 3 is made up of the following items: "name"; "telephone number"; "address"; "birth date"; "credit card number"; "height and weight"; and "blood type". It should be noted here that the user's personal information is to be made up of items required by each service provider apparatus included in the system, although FIG. 3 merely shows examples of the items.

(2) Verify User's Personal Information

Next, the personal information verification apparatus 11 verifies the user's personal information received from the service user apparatus 12, by comparing the user's personal information with information about the service user obtained from a reliable external information source (the information being inputted in advance in the personal information verification apparatus 11).

(3) Attach ID Number and Signature

The personal information verification apparatus 11 attaches a user ID number which is unique to the user and a digital signature to each item of the verified user's personal information, to generate signed-personal information.

Figure 4:
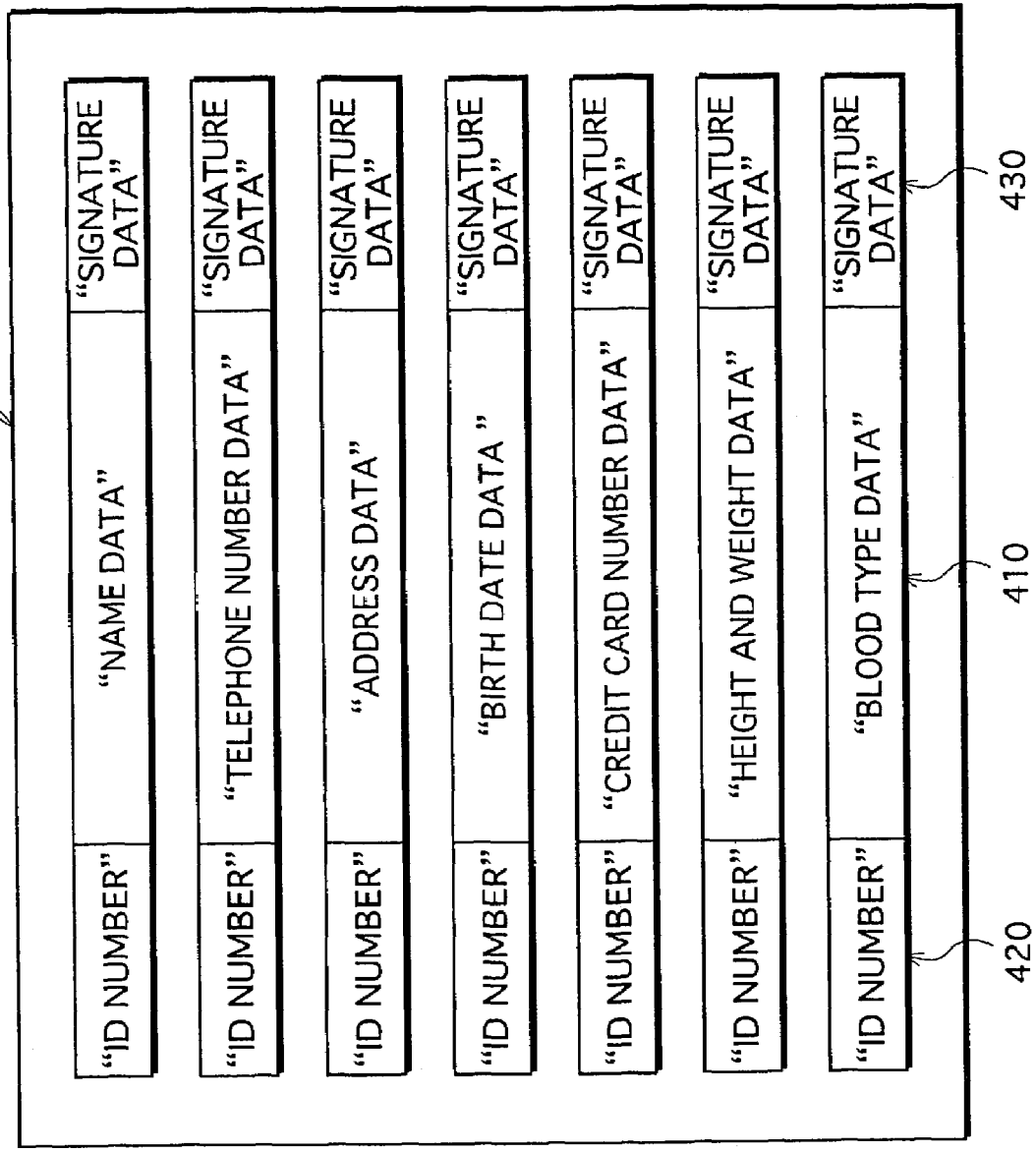
FIG. 4 shows an example structure of signed-personal information in the embodiment.

FIG. 4 schematically shows an example structure of signed-personal information 400. The signed-personal information 400 is made up of a plurality of items, each of which includes a "main data" part 410 to which a "user ID" part 420 and a "signature data" part 430 are attached. The "main data" part 410 represents data for each item of personal information transmitted from the service user apparatus 12.

The personal information verification apparatus 11 generates one user ID number and attaches the generated user ID number to each item of the personal information. The personal information verification apparatus 11 then generates a digital signature for each item to which the user ID number has been attached, by using a public key encryption method, and attaches the generated digital signature to each item. A digital signature generated here for each item is based on concatenated data of the contents of the item and the user ID number. This means that the value of the digital signature differs depending on each item. As one example, the ElGamal signature scheme may be employed as a method for generating signature data. The ElGamal signature scheme is described, for example, in "*Gendai Ango (Modern Cryptography)*" (Sangyo Tosho) written by Tatsuaki Okamoto and Hiroshi Yamamoto.

The personal information verification apparatus 11 encrypts the signed-personal information, and transmits the encrypted signed-personal information to the service user apparatus 12. To be more specific, the personal information verification apparatus 11 performs confidential communications based on the SSL (secure sockets layer) protocol.

Here, if the processing (2) of verifying the personal information is unsuccessful, the personal information verification apparatus 11 transmits a message requesting authentic personal information, to the service user apparatus 12. The processing then returns to (1).

(4) Store Signed-personal Information

The service user apparatus 12 receives the signed-personal information transmitted from the personal information verification apparatus 11, and first decrypts the signed-personal information. Further, the service user apparatus 12 encrypts the once decrypted signed-personal information by using a unique encryption key for storage, and stores the encrypted signed-personal information into its internal memory card.

B. Service Provision Procedure

The following describes a processing flow of the service provision procedure in which the service provider apparatus 13 provides services to the service user apparatus 12 according to an instruction from the service user.

Figure 5:
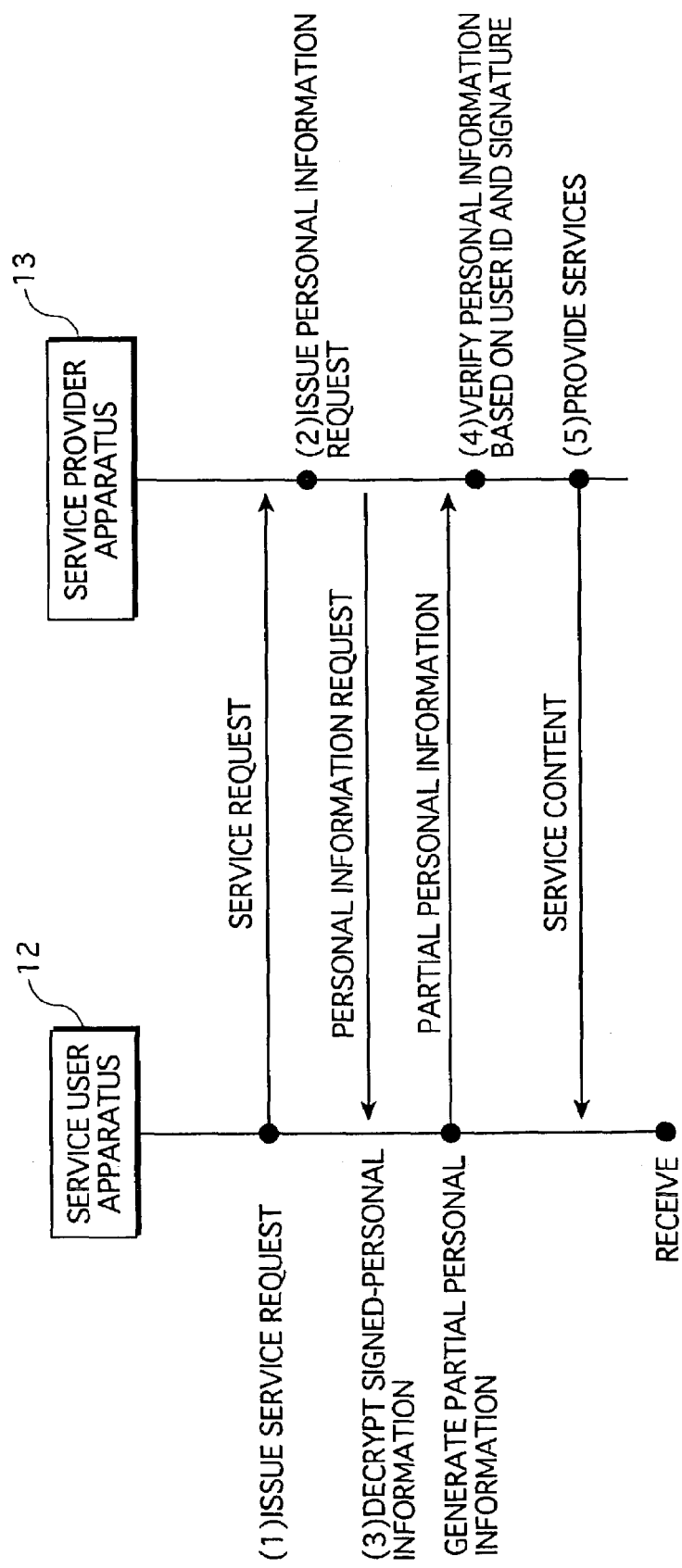
FIG. 5 shows a processing flow of a service provision procedure in the embodiment.

FIG. 5 shows the processing flow of the service provision procedure.

(1) Issue Service Request

First, the service user apparatus 12, which has received a user instruction to obtain services, issues a service request to the service provider apparatus 13 via the network "N".

(2) Issue Personal Information Request

The service provider apparatus 13, which has received the service request, issues a personal information request to the service user apparatus 12. The personal information request designates items of personal information which are necessary for the requested service provision. The personal information request is described using a predetermined format (determined in advance by the personal information verification apparatus 11), and designates each necessary item by using a serial number of the item (e.g., the serial number is "1" for the item "name" and "3" for the item "address" in the example of FIG. 4).

(3) Transmit Partial Personal Information

The service user apparatus 12, which has received the personal information request, decrypts the signed-personal information that has been encrypted and stored therein, extracts the items designated by the personal information request from the decrypted signed-personal information, and transmits the extracted items (=partial personal information) to the service provider apparatus 13. Here, the service user apparatus 12 performs confidential communications based on the SSL protocol for transmitting the partial personal information. It should be noted here that the service user apparatus 12 judges whether or not the personal information request is from an authentic service provider apparatus 13, by checking the description format of the personal information request. When the description format of the personal information request is different from what it should be, the service user apparatus 12 determines that the personal information request is an unauthorized request issued by a third party attempting to impersonate the service provider, and therefore does not transmit the partial personal information. It is assumed here that the service user apparatus 12 is notified in advance of the correct format in which the request should be described, by the personal information verification apparatus 11. Here, this verification of the personal information request may be performed, based on a digital signature attached to the request, instead of being based on the description format of the request. In that case, the service provider may use a request that has been verified and to which a digital signature has been attached by the personal information verification apparatus 11. Also, the service user apparatus 12 may be given in advance a public key to be used for verifying the signature, by the personal information verification apparatus 11.

Figure 6:
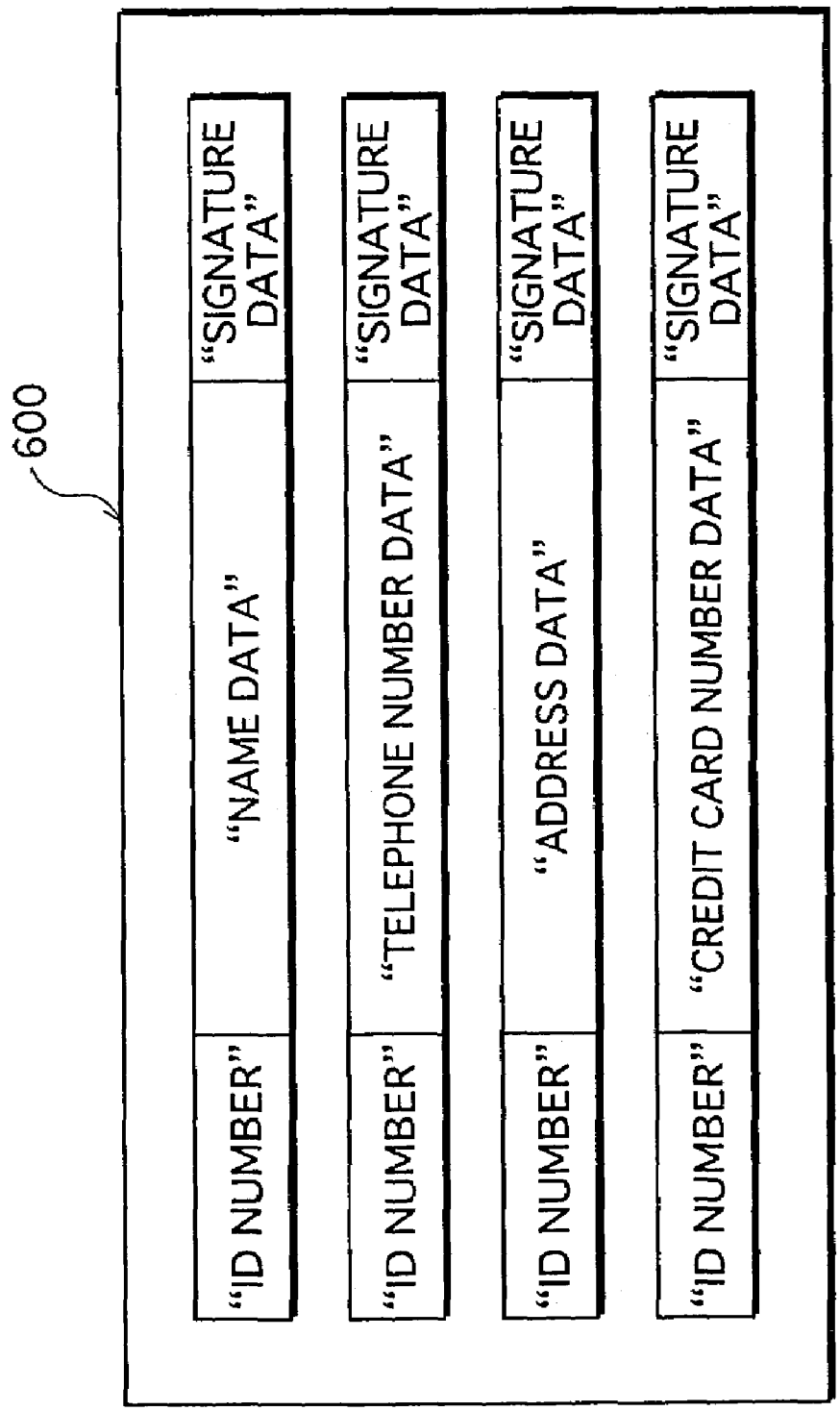
FIG. 6 shows an example structure of partial personal information in the embodiment.

FIG. 6 schematically shows an example structure of partial personal information 600. FIG. 6 exemplifies the contents of the partial personal information, when the four items "name", "telephone number", "address", and "credit card number", out of all items of the signed-personal information, are designated by a personal information request.

(4) Verify Personal Information based on User ID Number and Signature

The service provider apparatus 13, which has received the partial personal information, decrypts the partial personal information, and then verifies the partial personal information, based on the user ID number and signature. The verification process is described in detail later.

(5) Provide Services

When the verification of the partial personal information is successful, the service provider apparatus 13 provides services to the service user apparatus 12. Examples of services to be provided include distribution of digital music content via a network.

III. Construction of Each Apparatus

The following describes in detail the construction of each of the apparatuses (the personal information verification apparatus 11, the service user apparatus 12, and the service provider apparatus 13) that realize the above-described processing of the service providing system 1.

A. Construction of the Personal Information Verification Apparatus 11

The personal information verification apparatus 11 only executes processing relating to the personal information verification procedure.

Figure 7:
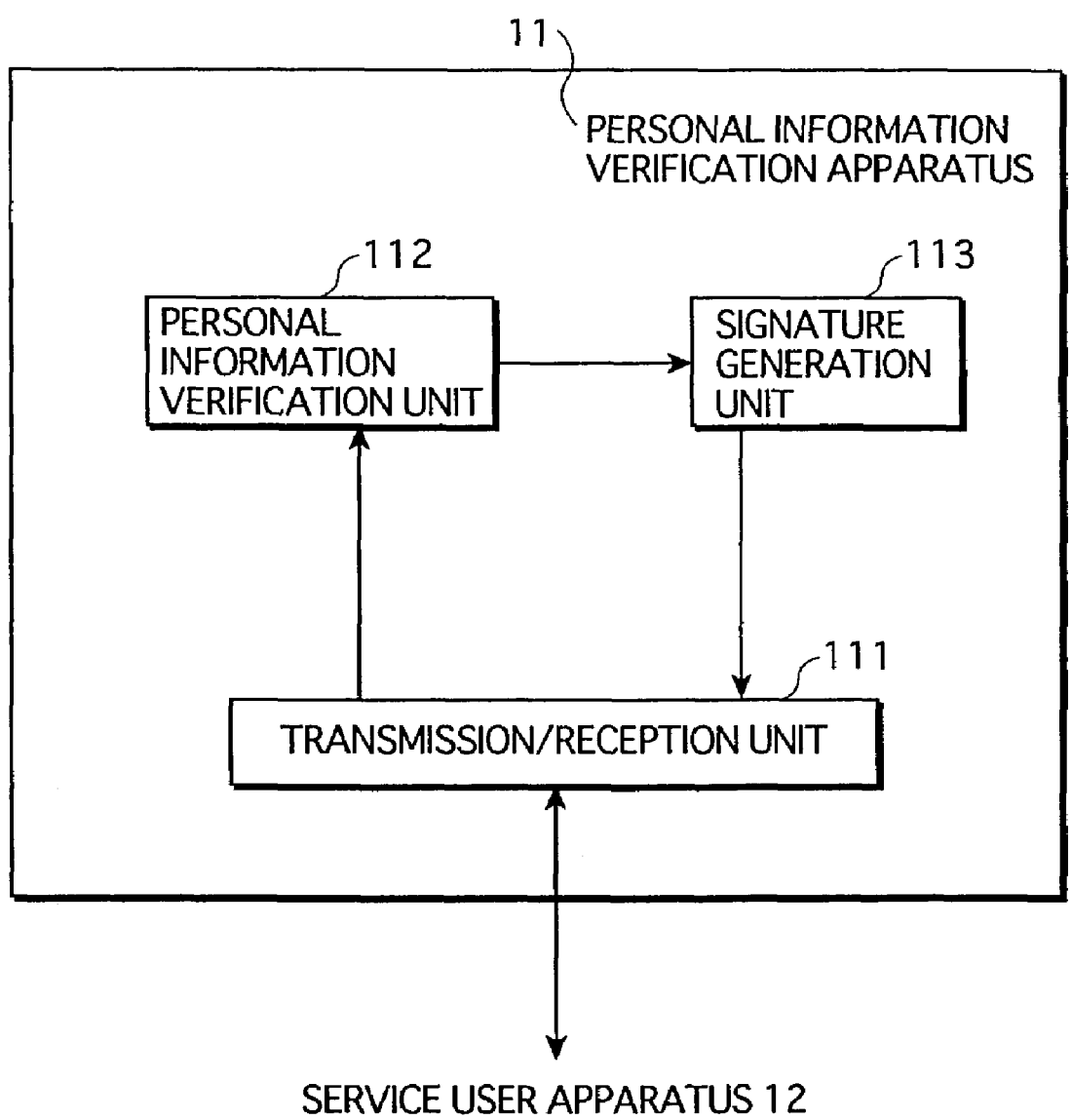
FIG. 7 is a block diagram showing the construction of a personal information verification apparatus in the embodiment.

FIG. 7 is a block diagram showing the construction of the personal information verification apparatus 11. The personal information verification apparatus 11 includes a transmission/reception unit 111, a personal information verification unit 112, and a signature generation unit 113. The transmission/reception unit 111 transmits and receives data (user's personal information that is yet to be verified, signed-personal information that has been verified, etc.) to and from the service user apparatus 12. The personal information verification unit 112 verifies personal information that has been received from the service user apparatus 12. The signature generation unit 113 attaches signature data guaranteeing the authenticity of personal information, to the verified personal information, so as to generate signed-personal information.

(1) Transmission/reception Unit 111

The transmission/reception unit 111 transmits and receives data to and from an external apparatus. In particular, the transmission/reception unit 111 receives a user's personal information from the service user apparatus 12, and transmits signed-personal information that has been verified, to the service user apparatus 12. For transmitting and receiving personal information (both verified and yet to be verified), the transmission/reception unit 111 encrypts the data for making it confidential. To be more specific, the transmission/reception unit 111 performs confidential communications based on the SSL protocol.

(2) Personal Information Verification Unit 112

The personal information verification unit 112 verifies the user's personal information that has been received by the transmission/reception unit 111 (i.e., judges whether or not the user who has sent the personal information can be authenticated). The verification can be realized by comparing the personal information that has been sent by the user of the service user apparatus 12, with the same type of information that a manager belonging to the authentication center has obtained from a reliable external information source and inputted into the personal information verification unit 112. The information with which the personal information is compared may specifically be information written on a certificate of residence mailed thereto by the user, or user information (including a credit card number) obtained from a credit card company with the user's permission.

(3) Signature Generation Unit 113

The signature generation unit 113 attaches a digital signature to the personal information that has been verified by the personal information verification unit 112. The signature generation unit 113 first receives the personal information from the personal information verification unit 112. Then, the signature generation unit 113 generates one user ID number which is unique to the user, and attaches the generated user ID number to the head of each item of the personal information.

Then, the signature generation unit 113 generates a digital signature for each personal information item to which the user ID number has been attached, and attaches the generated digital signature to each item. A method for generating a digital signature here is a public key encryption method (e.g., the ElGamal signature scheme). To be more specific, the signature generation unit 113 uses a private signing key. The private signing key is stored in advance in such an area that does not allow references from outside the personal information verification apparatus 11. Using the private signing key, the signature generation unit 113 generates a digital signature for each item, based on concatenated data of the user ID number and the corresponding item. It should be noted here that a public signing key corresponding to this private signing key is distributed in advance to each service provider apparatus 13 in the service providing system 1.

The digital signature is generated for each item of personal information in the above-described way, based on the contents of the item and the user ID number whose values differ depending on each user. As a result, the value of the digital signature differs depending on each user. Further, the value of the digital signature also differs depending on each item of the signed-personal information for one user.

B. Construction of the Service User Apparatus 12

The service user apparatus 12 executes processing relating to both the personal information verification procedure and the service provision procedure.

Figure 8:
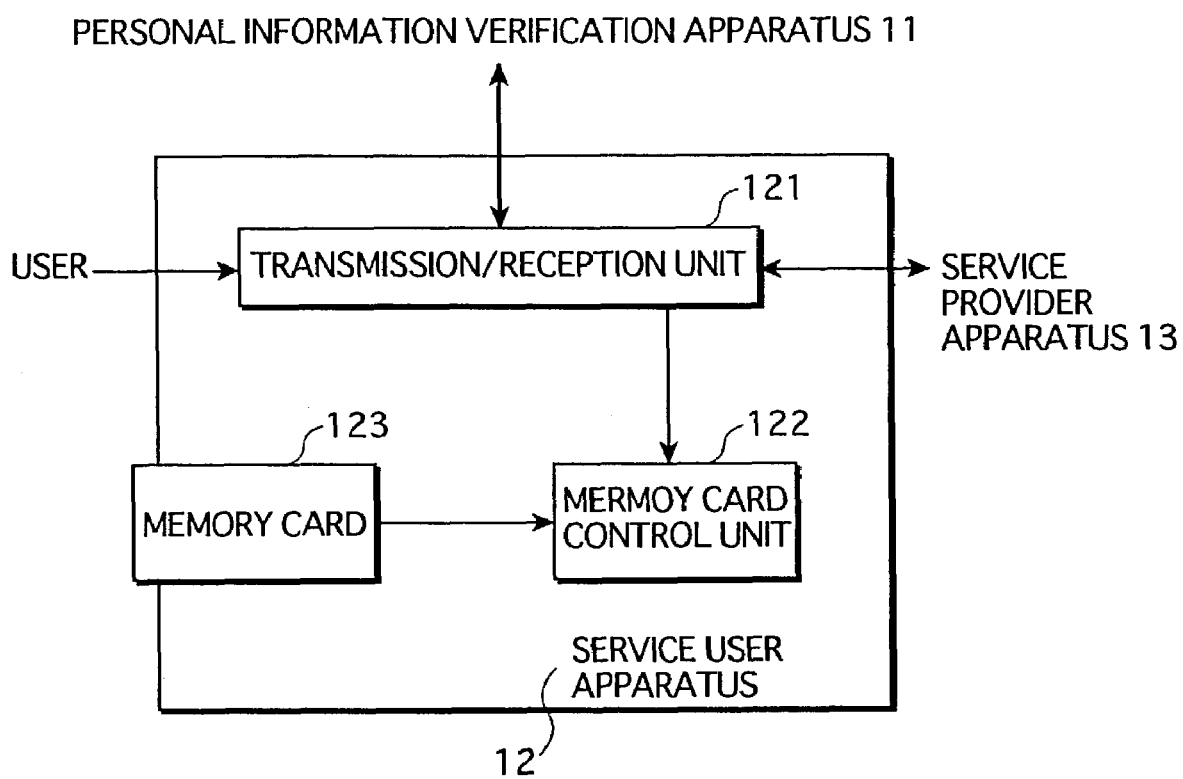
FIG. 8 is a block diagram showing the construction of a service user apparatus in the embodiment.

FIG. 8 shows the construction of the service user apparatus 12.

The service user apparatus 12 includes a transmission/reception unit 121, a memory card 123, and a memory card control unit 122. The transmission/reception unit 121 transmits and receives data to and from the personal information verification apparatus 11 and the service provider apparatus 13. The memory card 123 is for storing signed-personal information. The memory card control unit 122 controls the memory card 123. The memory card 123 is detachably inserted into a slot of the service user apparatus 12.

(1) Transmission/reception Unit 121

In the personal information verification procedure, the transmission/reception unit 121 transmits and receives personal information that is yet to be verified and personal information that has been verified, to and from the personal information verification apparatus 11. In the service provision procedure, the transmission/reception unit 121 transmits and receives various types of information (a personal information request, partial personal information, and service content) to and from the service provider apparatus 13. In either procedure, the transmission/reception unit 121 performs confidential communications based on the SSL protocol for the transmission and reception.

(2) Memory Card Control Unit 122

The memory card control unit 122 manages input and output of signed-personal information to and from the memory card 123. In the personal information verification procedure, the memory card control unit 122 stores signed-personal information into the memory card 123. To be more specific, the memory card control unit 122 decrypts the signed-personal information that has been received as being encrypted, and then outputs the decrypted signed-personal information to the memory card 123 together with an instruction to store the decrypted signed-personal information.

In the service provision procedure, the memory card control unit 122 reads personal information from the memory card 123. To be more specific, the memory card control unit 122 first obtains, via the transmission/reception unit 121, a personal information request that the service provider apparatus 13 has transmitted in response to a service request. Then, the memory card control unit 122 analyzes the personal information request, and identifies items designated as being requested by the service provider apparatus 13. The memory card control unit 122 transmits, together with information listing the items, an instruction to output the personal information to the memory card 123.

(3) Memory Card 123

The memory card 123 includes an IC card chip within which a program can be executed. The functions of the memory card 123 are not only to store signed-personal information but also to internally execute processing relating to the input and output, in response to an instruction transmitted from the memory card control unit 122.

Figure 9:
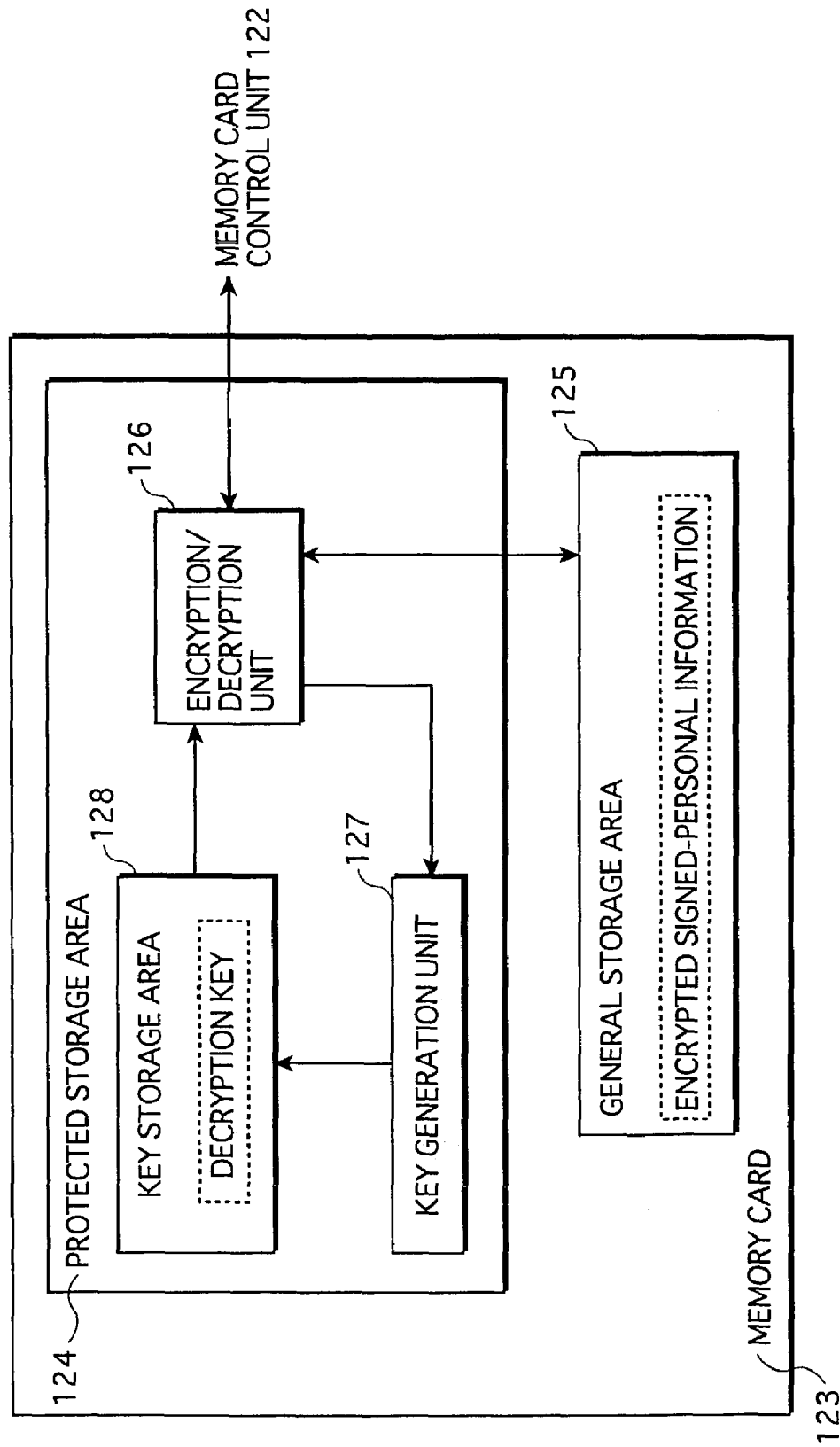
FIG. 9 is a block diagram showing the construction of a memory card included in the service user apparatus in the embodiment.

FIG. 9 is a block diagram showing the construction of the memory card 123. The memory card 123 may comprise an IC card chip that is tamper-resistant (i.e., protected from an unauthorized access). The IC card chip has the functions of storing and executing programs. The memory card 123 includes a protected storage area 124 that is tamper-resistant (IC card chip), and a general storage area 125 that has a large storage capacity. An encryption/decryption unit 126 and a key generation unit 127 are provided in the protected storage area 124. The encryption/decryption unit 126 executes encryption and decryption processes of signed-personal information. The key generation unit 127 generates keys for use in the encryption and decryption processes. The protected storage area 124 further includes a key storage area 128 for storing keys. It should be noted here that the encryption/decryption unit 126 and the key generation unit 127 are realized by programs stored in the protected storage area 124. These programs are executed by an arithmetic unit (not shown) internally provided in the memory card 123, so as to function as the encryption/decryption unit 126 and the key generation unit 127. The following describes the contents of the processing to be executed by each of the above-described main components in the personal information verification procedure and in the service provision procedure.

(4) Decryption/encryption Unit 126

In the personal information verification procedure, the encryption/decryption unit 126 encrypts signed-personal information transferred from the memory card control unit 122, and stores the encrypted signed-personal information into the general storage area 125. To be more specific, the encryption/decryption unit 126 instructs the key generation unit 127 to generate a key, at the time when receiving the signed-personal information from the memory card control unit 122. Then, upon receipt of the generated encryption key from the key generation unit 127, the encryption/decryption unit 126 encrypts the signed-personal information by using the received encryption key, and stores the encrypted signed-personal information into the general storage area 125.

In the service provision procedure, the encryption/decryption unit 126 decrypts the stored signed-personal information and outputs the decrypted signed-personal information in response to a request from the memory card control unit 122. To be more specific, upon receipt of the request from the memory card control unit 122, the encryption/decryption unit 126 reads a decryption key from the key storage area 128 and the encrypted signed-personal information from the general storage area 125. Then, the encryption/decryption unit 126 decrypts the signed-personal information by using the read decryption key. Here, only the items of the signed-personal information designated by the memory card control unit 122 are to be read and decrypted. The encryption/decryption unit 126 transmits the decrypted signed-personal information to the memory card control unit 122.

(5) Key Generation Unit 127

The key generation unit 127 executes processing only in the personal information verification procedure. The key generation unit 127 generates an encryption key and a decryption key for signed-personal information, in response to an instruction transmitted from the encryption/decryption unit 126. Then, the key generation unit 127 transmits the encryption key to the encryption/decryption unit 126 and stores the decryption key into the key storage area 128. The key storage area 128 is included in the protected storage area 124, and therefore, the decryption key stored therein cannot be directly accessed from outside of the memory card 123. The data encryption method employed here may either be a public key encryption method or a private key encryption method. For example, the DES (Data Encryption Standard) encryption method, which is one type of a private key encryption method, can be employed. In the case where a private key encryption method is employed, the encryption key and the decryption key are identical. It should be noted here that the DES encryption method is described, for example, in "*Gendai Ango (Modern Cryptography)*" (Sangyo Tosho) written by Tatsuaki Okamoto and Hiroshi Yamamoto.

C. Construction of the Service Provider Apparatus 13

The service provider apparatus 13 executes processing in the service provision procedure.

Figure 10:
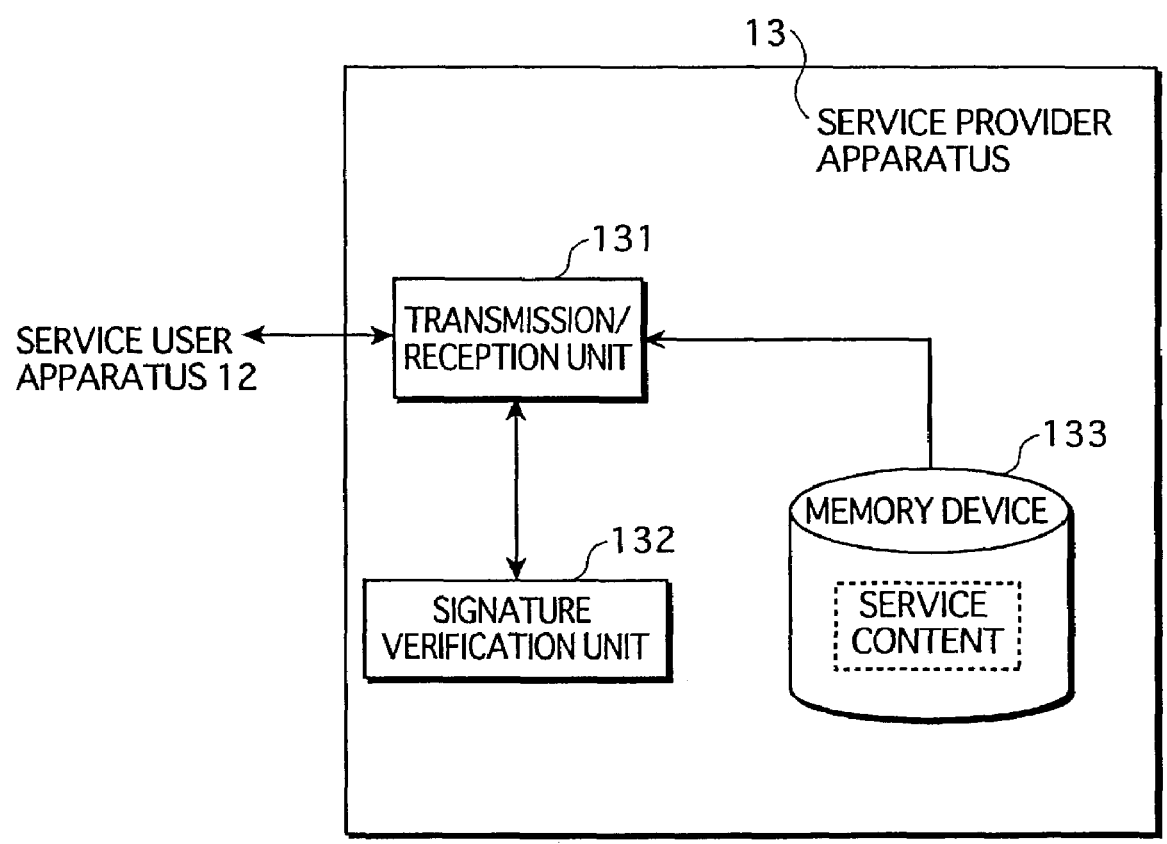
FIG. 10 is a block diagram showing the construction of the service provider apparatus in the embodiment.

FIG. 10 shows the construction of the service provider apparatus 13. The service provider apparatus 13 includes a transmission/reception unit 131, a signature verification unit 132, and a memory device 133. The transmission/reception unit 131 transmits and receives data to and from the service user apparatus 12. The signature verification unit 132 verifies signed-personal information that is transmitted from the service user apparatus 12 together with a service request. The memory device 133 stores service content to be provided.

The transmission/reception unit 131 receives a service request from the service user apparatus 12. In response to the service request, the transmission/reception unit 131 transmits a personal information request to the service user apparatus 12, and receives partial personal information from the service user apparatus 12. Upon receipt of the requested partial personal information, the transmission/reception unit 131 transmits the partial personal information to the signature verification unit 132. When the verification of the partial personal information by the signature verification unit 132 is successful, the transmission/reception unit 131 reads service content requested by the memory device 133, and transmits the read service content to the service user apparatus 12. On the other hand, when the verification of the partial personal information by the signature verification unit 132 is unsuccessful, the transmission/reception unit 131 transmits an error message to the service user apparatus 12. It should be noted here that when the service content is transmitted to the service user apparatus 12, the transmission/reception unit 131 enters such information that is necessary for billing a service fee (i.e., user name, credit card number, and service content provided) into a historical database that is not shown in FIG. 10. Such information is later referred to at the time of a service-fee settlement.

The signature verification unit 132 analyzes the service request that the transmission/reception unit 131 has received from the service user apparatus 12, and identifies items of personal information which are necessary for the requested service provision. Then, the signature verification unit 132 generates a personal information request for requesting the necessary items of personal information, and transmits the generated personal information request to the transmission/reception unit 131, so as to instruct the transmission/reception unit 131 to transmit these items to the service user apparatus 12.

Following this, the signature verification unit 132 obtains, via the transmission/reception unit 131, the requested partial personal information transmitted from the service user apparatus 12. Then, the signature verification unit 132 verifies the obtained partial personal information based on the attached signature and user ID.

To verify the obtained partial personal information, the signature verification unit 132 performs the following "signature verification" and "user ID matching". To be more specific, the signature verification unit 132 first judges whether or not each item of the partial personal information has been verified by the personal information verification apparatus 11 (signature verification). As this judgment method, a well-known method using a public signing key is employed. The public signing key is distributed in advance from the personal information verification unit 11. To be more specific, the signature verification unit 132 judges whether or not the relationship among (a) the public signing key, (b) the "signature data" part 430 (see FIG. 4) that has been attached to each item, and (c) data on which the signature is based (i.e., the concatenated data of the "user ID" part 420 and the "main data" part 410) satisfies a predetermined relationship called a "signature verification expression".

The signature verification unit 132 further judges whether or not each item of the partial personal information is given the same user ID number (user ID matching). Because the above signature verification can only indicate the authenticity of each individual item, this user ID matching needs to be performed for the purpose of detecting such signed-personal information that is forged for a person who does not actually exist. For example, signed-personal information may be forged by a method of extracting some items from a plurality of users' signed-personal information and combining these items. To detect such forged signed-personal information, the judgment is performed as to whether or not the user IDs attached to all the items of the partial personal information match. When judging that the user IDs attached to all the items do not match, the signature verification unit 132 determines that the signed-personal information has been forged as including items extracted from plural users' signed-personal information.

If the verification of the signed-personal information by the signature verification unit 132 using either the signature verification or the user ID matching is unsuccessful, the signature verification unit 132 transmits a message indicating that an unauthorized conduct has been detected, to the transmission/reception unit 131, and instructs the transmission/reception unit 131 to transmit an error message to the service user apparatus 12.

IV. Conclusions

In the service providing system 1 relating to the present embodiment as described above, the personal information verification apparatus 11 verifies personal information, attaches a signature to the verified personal information to generate signed-personal information, and then returns the signed-personal information to the service user apparatus 12, instead of centrally managing signed-personal information in conventional ways. To be more specific, signed-personal information for each user is stored in the service user apparatus 12 held by each user, respectively. Therefore, unlike conventional systems, the service providing system 1 is free from such security problems as leaking out of personal information for a large number of users at once from the authentication center. Also, the service providing system 1 can exhibit enhanced system stability because the service user apparatus 12 in the system 1 is not required to access the authentication center when using services.

Further, in the service user apparatus 12, the signed-personal information is encrypted and then stored in the memory card of the service user apparatus 12, and the decryption key of the signed-personal information is stored in an area that does not allow references from outside the service user apparatus 12. In this way, the security of the signed-personal information is strictly protected. Therefore, the fact that the manager of the signed-personal information is changed from the authentication center to the user does not cause the reliability of the signed-personal information in the service providing system 1 to become inferior to that in the conventional systems.

Also, a user ID number which is unique to a user is attached to each item of signed-personal information for the user. Assume, for example, that a third party attempts to forge signed-personal information for a person who does not actually exist, by combining a name of user A and an address of user B, with the intension of receiving services in an unauthorized manner. Even if such an attempt is made, the user ID numbers attached to all the items of the forged signed-personal information do not match, and therefore, the unauthorized conduct can be detected. In this way, the reliability of the signed-personal information as seen from the service provider is enhanced.

Also, the signed-personal information is stored in the memory card that is detachable from the service user apparatus 12. Therefore, when the service user apparatus 12 needs to be exchanged to a new apparatus due to a breakdown or the like, the user is simply required to move the memory card to the new apparatus. By doing so, the user can immediately receive services by using the new apparatus.

In conventional service providing systems, the service user apparatus is required to access the authentication center every time when receiving services. In such conventional systems, the authentication center can be given information about the state of service use, such as information about the frequency and types of service providers each user uses (i.e., preference of each service user, sales performance of each service provider, etc.). In the service providing system 1 relating to the present embodiment, however, the service user apparatus is not required to access the authentication center when receiving services, and therefore, the authentication center has no chance of obtaining such information. Accordingly, the service users and service providers do not have to worry about leakage of information via the authentication center. This system 1 is therefore more reliable for the service providers than conventional systems.

Modified Example

In the service providing system 1 relating to the embodiment described above, the signed-personal information is protected strictly within the service user apparatus 12. However, even this system 1 has the possibility that the signed-personal information may be stolen by a third party using unauthorized means such as wiretapping. If this happens, the third party can impersonate the user by presenting the stolen signed-personal information to the service provider apparatus.

To prevent such a third party who has managed to steal signed-personal information from being able to impersonate the user with the stolen information, the present modified example discloses a service providing system in which a service provider can authenticate a transmission source of personal information by an authentication method based on a public key encryption method.

The following describes the characteristics of the service providing system relating to the present modified example. The service user apparatus generates in advance a pair of public and private keys to be used for apparatus authentication that is required before receiving services. The personal information verification apparatus in advance verifies the public key for apparatus authentication purposes (public authentication key), as one item of personal information. For receiving services, the service user apparatus transmits signed-personal information including the public authentication key, to the service provider. The service provider provides services to the service user apparatus only after authenticating the service user apparatus.

As the construction which is unique to the present modified example, the service user apparatus additionally includes an authentication key generation unit. The authentication key generation unit generates a pair of public and private keys for apparatus authentication purposes, at the time when the user inputs personal information that is to be verified. Also, the signature verification unit included in the service provider apparatus executes processing of authenticating the transmission source of the personal information by using the public authentication key, in addition to the processing described in the above embodiment.

The following describes the personal information verification procedure and the service provision procedure in the present modified example, with reference to the drawings. It should be noted here that parts of these procedures that overlap with the procedures described in the above embodiment are not described here.

Figure 11:
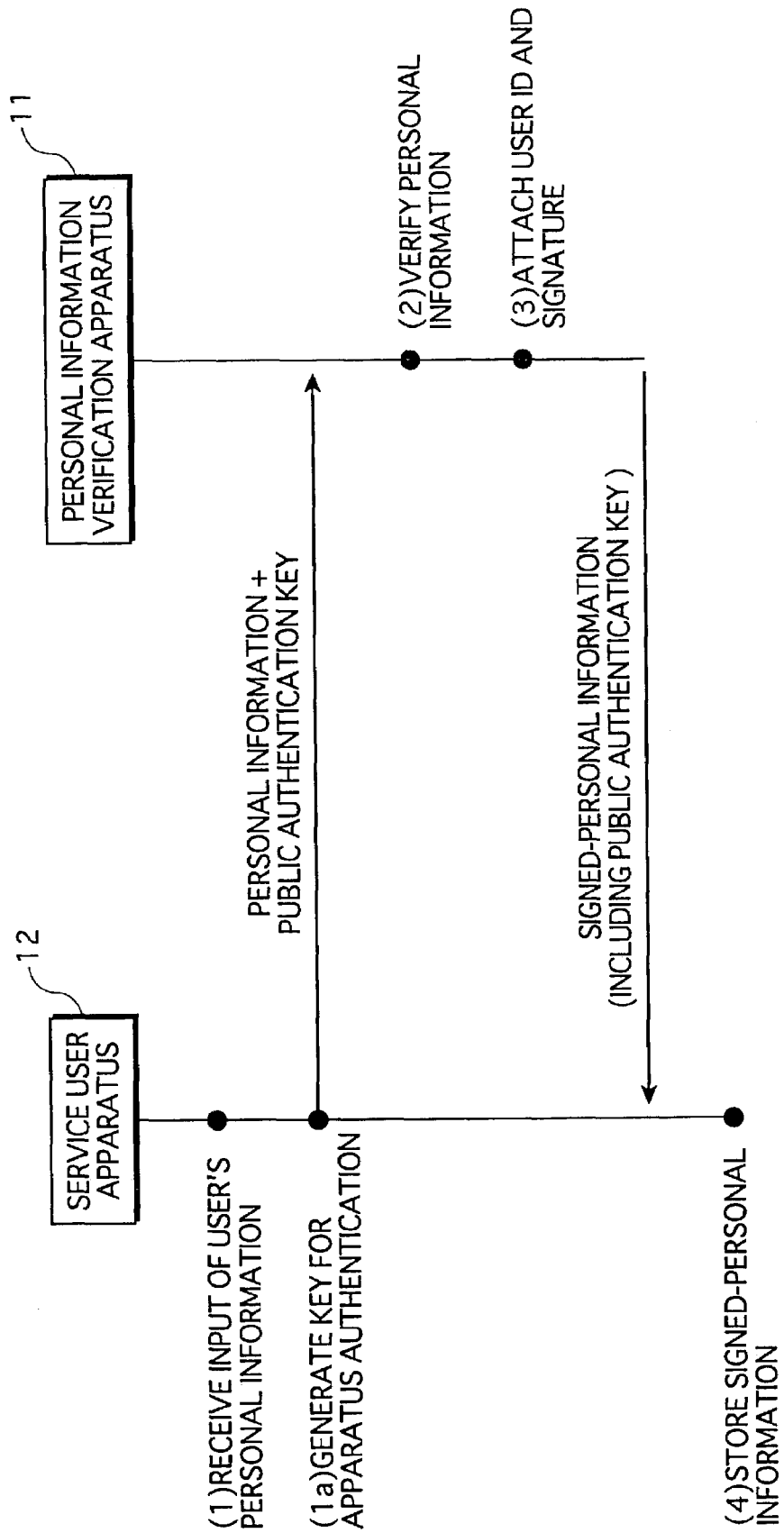
FIG. 11 shows a processing flow of a personal information verification procedure in a modified example of the embodiment.

FIG. 11 shows the personal information verification procedure in the present modified example.

The processing which is unique to the present modified example is the processing (1a) of generating authentication keys. Here, the authentication key generation unit, which has received an input of personal information from the user, generates a pair of public and private authentication keys, based on the public key encryption method. Then, the authentication key generation unit transmits the public authentication key to the transmission/reception unit 121 (see FIG. 8), together with the input personal information, and instructs the transmission/reception unit 121 to transmit the public authentication key and the personal information to the personal information verification apparatus. On the other hand, the authentication key generation unit stores the private authentication key into the key storage area 128 (see FIG. 9) included in the protected storage area 124 within the memory card 123. Here, any type of public key encryption methods can be employed. For example, the ElGamal encryption method can be employed.

The processing (2) and the processing (3) to be executed thereafter by the personal information verification apparatus 11 are the same as those described in the above embodiment. The public authentication key is handled in the same manner as other items of personal information.

FIGS. 12A and 12B show an example structure of personal information in the present modified example. FIG. 12A shows personal information that is yet to be verified and signed. FIG. 12B shows personal information that has been verified and signed. The personal information in the modified example differs from the personal information in the above embodiment in that it additionally includes "public authentication key" data 1201 as one item. In the same way as other items of the personal information, a user ID number is first attached to this item of the public authentication key and then a digital signature is attached to the item.

The processing (4) to be executed after the signed-personal information is transmitted to the service user apparatus is also the same as that described in the above embodiment.

FIG. 13 shows the service provision procedure in the present modified example.

The processing which is unique to the present modified example is the processing (4a) of apparatus authentication by using public key encryption.

The processing (1) of issuing a service request, through the processing (4) of verifying personal information based on an ID number and signature are substantially the same as those described in the above embodiment. It should be noted here that in the processing (2), a personal information request transmitted from the service provider apparatus to the service user apparatus inevitably designates the public authentication key as one item which is necessary for any service provision.

The processing (4a) is executed by the signature verification unit (see FIG. 10) included in the service provider apparatus. The signature verification unit first executes the processing (4) of verifying the partial personal information based on a user ID number and signature, and then judges whether or not the transmission source of the personal information is an authentic service user apparatus (an apparatus that stores the corresponding private authentication key). As the judgment method, any type of methods based on a public key encryption method can be employed. One example is a method described in "9.4 *Public Key Cryptography—System using Digital Signatures*" in "*Gendai Ango (Modern Cryptography)*" (Sangyo Tosho) written by Tatsuaki Okamoto and Hiroshi Yamamoto.

In the service provision procedure in the present modified example, the personal information transmission source is authenticated by using a public key encryption method. Therefore, it is impossible to receive services with an apparatus that does not store a private authentication key corresponding to a public authentication key included in the signed partial personal information. Accordingly, even if a third party attempts to obtain signed-personal information in an unauthorized manner and impersonate an authenticated service user, with the intention of receiving services, such an attempt ends in failure. This further enhances the reliability of the signed-personal information in the service providing system. Also, once a private authentication key is generated and stored, the private authentication key is not allowed to be output from the protected storage area in the memory of the service user apparatus, thereby enabling the system to be highly secure.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

For example, an expiration time may be set for signed-personal information. To be more specific, the personal information verification apparatus attaches expiration-time information to signed-personal information. The service provider refers to the expiration time before providing services. If the personal information is expired, the service provider issues, to the service user apparatus that has transmitted the signed-personal information, a request to obtain new signed-personal information that is based on the latest personal information. In this way, the reliability of the signed-personal information can be enhanced further.

Also, in the service provision procedure, a process of decrypting encrypted signed-personal information to be executed within the memory card may not be started until a password set in advance by the service user is inputted. In this case, even if the service user apparatus with the memory card being inserted therein is stolen by a third party, the third party, who does not know the password, cannot receive services by using the personal information stored in the memory card. This enhances the security. Here, biometrics information of the service user (such as a fingerprint, iris code, and voice print) may be used instead of a password.

Also, although the above embodiment describes the case where the communications between the personal information verification apparatus and the service user apparatus, and between the service user apparatus and the service provider apparatus are realized by confidential communications based on the SSL protocol, the confidential communications may be realized by other methods.

Also, although the above embodiment describes the case where passing of personal information between the personal information verification apparatus 11 and the service user apparatus 12 in the personal information verification procedure is realized by communications via a network, the passing of personal information may be realized by other methods. For example, the service user may bring the service user apparatus 12 to the authentication center 1, and directly input and output data by operating the service user apparatus 12 and the personal information verification apparatus 11. Alternatively, personal information may be recorded on a memory card, the memory card storing the personal information may be mailed to the authentication center 1, and the authentication center 1 may return the memory card to the user. In either case, the leakage of personal information via communication paths can be prevented. The service providing system in which the personal information verification apparatus and the service user apparatus are not connected via a network is also possible.

Also, the service user may be enabled to check contents of a personal information request before the service user apparatus transmits partial personal information in response to the personal information request transmitted from the service provider apparatus. To realize this, an interface unit can be additionally included in the service user apparatus. The interface unit may display the request contents on the screen, and receive an instruction from the service user. Alternatively, the interface unit may receive in advance, from the service user, a designation of items that can be presented from the service user to the service provider.

Also, the personal information verification apparatus may verify in advance the contents of a personal information request that the service providing apparatus transmits to the service user apparatus at the time of service provision, in the same manner as that for verifying a user's personal information. In this case, a signature may be attached to data of the authenticated personal information request, and the signed request may be returned to the service provider apparatus. Then, the service user apparatus may respond only to such a personal information request that has a signature indicating its authenticity. In this case, a public key for signature verification is transmitted in advance from the personal information verification apparatus to the service user apparatus. By doing so, even if a third party who attempts to send an unauthorized personal information request and impersonate the service provider, such an attempt ends in failure. This enhances the security of the personal information within the system.

Further, the construction part of the service user apparatus for storing signed-personal information may not necessarily be realized by a memory card. The storage apparatus included in the service user apparatus may be provided with a storage area protected from an unauthorized access, and signed-personal information may be stored in this storage area.

What is claimed is:

1. A service providing system comprising:
   a verification apparatus operable to receive a user's personal information comprising a plurality of data items, said verification apparatus including
   a personal information verification unit operable to verify an authenticity of the user's personal information, and
   a signed-personal information generation unit operable to, when said personal information verification unit verifies the authenticity of the personal information, generate signed-personal information by attaching a digital signature to each data item of the user's personal information, and to transmit the signed-personal information;

a service user apparatus including
a signed-personal information reception unit operable to transmit the user's personal information to said verification apparatus and to receive the signed-personal information from said verification apparatus,
an information management unit operable to store and manage the received signed-personal information,
a service request transmission unit operable to read the signed-personal information from said information management unit and to transmit the read signed-personal information together with a service request, and
a service reception unit operable to receive services; and a service provider apparatus operable to provide, based on the user's personal information, the services to said service user apparatus via the network, said service provider apparatus including
a service request reception unit operable to receive the service request and the signed-personal information from said service user apparatus,
a signed-personal information verification unit operable to verify an authenticity of the received signed-personal information, by verifying an authenticity of the digital signature attached to each data item of the user's personal information, and
a service provision unit operable to provide the services to the service user apparatus in response to the service request, when said signed-personal information verification unit verifies the authenticity of the signed-personal information.

2. The service providing system of claim 1, wherein said information management unit is operable to store the signed-personal information in a state that prevents external access thereof, and to allow the signed-personal information to be read only when key information set in advance is inputted.

3. The service providing system of claim 2, wherein the key information is password information or biometrics information.

4. The service providing system of claim 1, wherein said information management unit comprises:
a key generation subunit operable to generate an encryption key to be used for encrypting the signed-personal information, and a decryption key to be used for decrypting the encrypted signed-personal information;
a key storage subunit operable to store the decryption key;
an encryption subunit operable to encrypt the signed-personal information by using the encryption key;
an information storage subunit operable to store the signed-personal information encrypted by said encryption subunit; and
a decryption subunit operable to decrypt the encrypted signed-personal information read from said information storage subunit by using the decryption key read from said key storage subunit.

5. The service providing system of claim 4, wherein said information management unit comprises an IC memory card that includes a protected storage area, a general storage area, and an arithmetic unit,
wherein said protected storage area is protected from external access thereof, said general storage area is operable to allow external access thereof, and said arithmetic unit is operable to execute a program,
wherein said encryption subunit and said decryption subunit are realized by said arithmetic unit executing programs stored in said protected storage area,
wherein said key storage subunit is operable to store the decryption key into said protected storage area, and
wherein said information storage subunit is operable to store the encrypted signed-personal information into said general storage area.

6. The service providing system of claim 1, wherein said service request reception unit is operable to transmit a personal information request to said service user apparatus, before receiving the signed-personal information from said service user apparatus, and
wherein said service request transmission unit is operable to receive the personal information request before starting to transmit the signed-personal information, and only when the received personal information request satisfies a predetermined condition, to transmit the signed-personal information to said service provider apparatus.

7. The service providing system of claim 6, wherein the personal information request has been generated in a format determined in advance,
wherein the personal information request has been verified and a digital signature has been attached thereto by said verification apparatus, and
wherein said service request transmission unit is operable to verify an authenticity of the digital signature attached to the personal information request by using a form-signing public key distributed in advance from said verification apparatus, and when the verification of the digital signature attached to the personal information request by using the form-signing public key is successful, to determine that the personal information request satisfies the predetermined condition.

8. The service providing system of claim 1, wherein said service user apparatus further includes:
an authentication key generation unit operable to generate a pair of public and private keys to be used for authentication of said service user apparatus; and
a private key storage unit operable to store, in a form that limits external access thereof, the private key generated by said authentication key generation unit,
wherein said signed-personal information reception unit is operable to incorporate the private key generated by said authentication key generation unit into the user's personal information that is to be transmitted to said verification apparatus,
wherein said service request transmission unit is operable to incorporate the private key generated by said authentication key generation unit into the signed-personal information that is to be transmitted to said service provider apparatus, and
wherein said signed-personal information verification unit is operable to perform authentication of said service user apparatus by using a public key encryption method, by referring to the private key incorporated in the signed-personal information transmitted by said service request transmission unit, and when the authentication of said service user apparatus is successful, to determine that verification of the signed-personal information is successful.

9. The service providing system of claim 8, wherein said private key storage unit comprises a storage medium having a protected storage area that allows only limited external access thereof, and said private key storage unit is operable to store the private key into said protected storage area.

10. A service providing system comprising:
   a verification apparatus operable to receive a user's personal information comprising a plurality of data items, said verification apparatus including
      a personal information verification unit operable to verify an authenticity of the user's personal information, and
      a signed-personal information generation unit operable to, when said personal information verification unit verifies the authenticity of the personal information, generate signed-personal information by attaching a user ID which is unique to the user to each data item and attaching a digital signature to each data item to which the user ID has been attached, and to transmit the signed-personal information;
   a service user apparatus including
      a signed-personal information reception unit operable to transmit the user's personal information to said verification apparatus and to receive the signed-personal information from said verification apparatus,
      an information management unit operable to store and manage the received signed-personal information,
      a service request transmission unit operable to read the signed-personal information from said information management unit and to transmit the read signed-personal information together with a service request, and
      a service reception unit operable to receive services; and
   a service provider apparatus operable to provide, based on the user's personal information, the services to said service user apparatus via the network, said service provider apparatus including
      a service request reception unit operable to receive the service request and the signed-personal information from said service user apparatus,
      a signed-personal information verification unit operable to verify an authenticity of the received signed-personal information based on the digital signature attached to each data item to which the user ID has been attached, judge whether user IDs attached to all data items of the signed-personal information received by the service request reception unit match, and when judging that the user IDs do mot match, to determine that verification of the signed-personal information is unsuccessful, and
      a service provision unit operable to provide the services to the service user apparatus in response to the service request, when said signed-personal information verification unit verifies the authenticity of the signed-personal information.

11. The service providing system of claim 10, wherein said signed-personal information generation unit is operable to attach, to each data item to which the user ID has been attached, a digital signature generated by using contents of the data item and the user ID, and
   wherein said signed-personal information verification unit is operable to verify an authenticity of the signed-personal information by verifying an authenticity of the digital signature attached to each data item.

12. A verification apparatus for use in a service providing system where services are provided from a service provider apparatus to a service user apparatus via a network, based on a user's personal information that is verified by said verification apparatus, the verification apparatus comprising:
   a personal information verification unit operable to verify an authenticity of the user's personal information that is received from the service user apparatus, the user's personal information comprising a plurality of data items; and
   a signed-personal information generation unit operable to, when said personal information verification unit verifies the authenticity of the personal information, generate signed-personal information by attaching a digital signature to each data item of the verified user's personal information, and transmit the signed-personal information to the service user apparatus,
   wherein the service provider apparatus is operable to receive the signed-personal information from the service user apparatus, and verify an authenticity of the signed-personal information by verifying an authenticity of the digital signature attached to each data item of the user's personal information.

13. A service user apparatus for use in a service providing system where services are provided from a service provider apparatus to said service user apparatus via a network, based on a user's personal information that is verified by a verification apparatus, said service user apparatus comprising:
   a signed-personal information reception unit operable to transmit the user's personal information, which comprises a plurality of data items, to the verification apparatus and receive, from the verification apparatus, signed-personal information that is the user's personal information verified by said verification apparatus, the signed-personal information including a digital signature attached to each data item of the user's personal information;
   an information management unit operable to store and manage the received signed-personal information;
   a service request transmission unit operable to read the signed-personal information from said information management unit, and transmit the read signed-personal information together with a service request, to the service provider apparatus; and
   a service reception unit operable to receive services that are provided by the service provider apparatus in response to the service request, wherein the service provider apparatus is operable to receive the signed-personal information from the service user apparatus, and verify an authenticity of the signed-personal information by verifying an authenticity of the digital signature attached to each data item of the user's personal information.

14. An information management apparatus for use in a service providing system where services are provided from a service provider apparatus to a service user apparatus via a network based on a user's personal information that is verified by a verification apparatus,
   wherein the verification apparatus is operable to receive the user's personal information, which includes a plurality of data items, and generate signed-personal information by attaching a digital signature to each data item of the user's personal information, when verifying the user's personal information to be authentic, and transmit the signed-personal information to the service user apparatus,
   wherein the service provider apparatus is operable to receive the signed-personal information from the service user apparatus, and verify an authenticity of the signed-personal information by verifying an authenticity of the digital signature attached to each data item of the user's personal information, and wherein said information management apparatus is operable to be used by the service user apparatus for storing the signed-personal information that is the verified user's personal information, said information management apparatus comprising:
a key generation unit operable to generate an encryption key to be used for encrypting the signed-personal information, and a decryption key to be used for decrypting the encrypted signed-personal information;
a key storage unit operable to store the decryption key;
an encryption unit operable to encrypt the signed-personal information by using the encryption key;
an information storage unit operable to store the signed-personal information encrypted by said encryption unit; and
a decryption unit operable to decrypt the encrypted signed-personal information read from the information storage unit using the decryption key read from the key storage unit,
wherein said information management apparatus comprises an IC memory card that includes a protected storage area, a general storage area, and an arithmetic unit,
wherein said protected storage area is protected from external access thereof, said general storage area is operable to allow external access thereof, and said arithmetic unit is operable to execute a program,
wherein said encryption unit and said decryption unit are realized by said arithmetic unit executing programs stored in said protected storage area,
wherein said key storage unit is operable to store the decryption key into said protected storage area, and
wherein said information storage unit is operable to store the encrypted signed-personal information into said general storage area.

15. A service provider apparatus for use in a service providing system where services are provided from said service provider apparatus to a service user apparatus via a network, based on a user's personal information that is verified by a verification apparatus,
wherein the verification apparatus is operable to receive the user's personal information, which includes a plurality of data items, and generate signed-personal information by attaching a digital signature to each data item of the user's personal information, when verifying the user's personal information to be authentic, and transmit the signed-personal information to the service user apparatus, and
wherein said service provider apparatus comprises:
a service request reception unit operable to receive, from the service user apparatus, a service request and the signed-personal information that is the user's personal information verified by the verification apparatus;
a signed-personal information verification unit operable to verify an authenticity of the received signed-personal information by verifying the digital signature attached to each data item of the user's personal information; and
a service provision unit operable to provide services to the service user apparatus in response to the service request when said signed-personal information verification unit verifies the authenticity of the signed-personal information.

16. A service providing method for use in a service providing system where services are provided from a service provider apparatus to a service user apparatus via a network, based on a user's personal information that is verified by a verification apparatus, said method comprising:
verifying personal information via the verification apparatus by verifying an authenticity of the user's personal information that is received from the service user apparatus, the user's personal information including a plurality of data items;
generating signed-personal information via the verification apparatus by attaching a digital signature to each data item of the verified user's personal information, and transmitting the signed-personal information to the service user apparatus, when the verification of the personal information is successful;
receiving signed-personal information via the service user apparatus by transmitting the user's personal information to the verification apparatus and receiving the signed-personal information from the verification apparatus;
performing information management via the service user apparatus by storing and managing the received signed-personal information;
transmitting a service request via the service user apparatus by reading the signed-personal information and transmitting the read signed-personal information together with a service request to the service provider apparatus;
receiving services via the service user apparatus by receiving services that are provided by the service provider apparatus in response to the service request;
receiving a service request via the service provider apparatus by receiving the service request and the signed-personal information from the service user apparatus;
verifying the signed-personal information via the service provider apparatus by verifying an authenticity of the digital signature attached to each data item included in the received signed-personal information; and
providing services via the service provider apparatus by providing the services to the service user apparatus, when the verification of the signed-personal information is successful.

* * * * *

UNITED STATES PATENT AND TRADEMARK OFFICE
CERTIFICATE OF CORRECTION

PATENT NO. : 7,254,705 B2 Page 1 of 1
APPLICATION NO. : 10/375138
DATED : August 7, 2007
INVENTOR(S) : Kaoru Yokota et al.

It is certified that error appears in the above-identified patent and that said Letters Patent is hereby corrected as shown below:

Column 23

Line 45, "do mot match" should read --do not match--.

Signed and Sealed this

Eighteenth Day of December, 2007

JON W. DUDAS
*Director of the United States Patent and Trademark Office*